Aug. 28, 1934.   W. S. BURDICK   1,971,929
FRICTION DEVICE
Filed Feb. 10, 1932   2 Sheets-Sheet 1
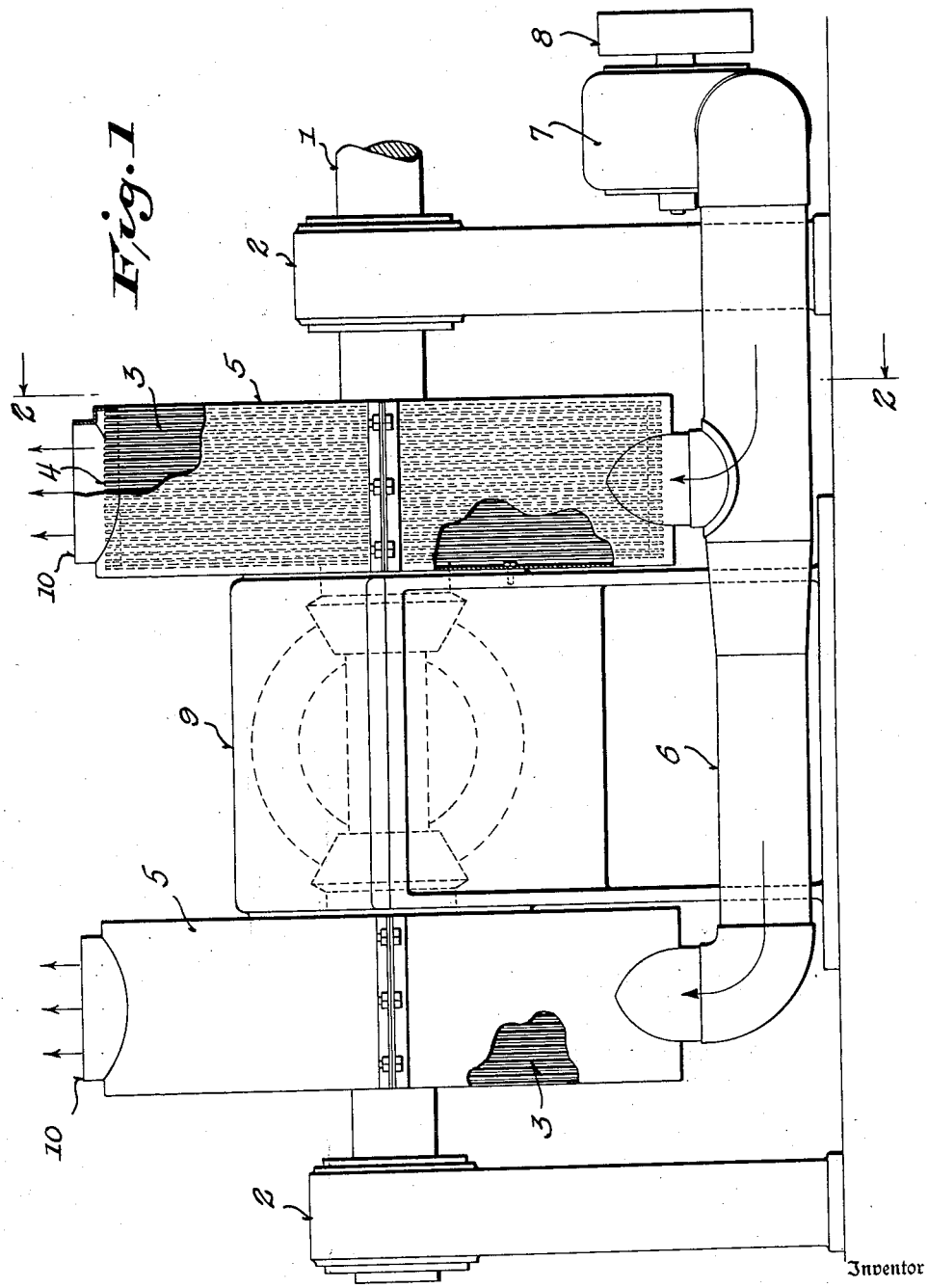
Inventor
Will S. Burdick
By
Attorney Aug. 28, 1934.  W. S. BURDICK  1,971,929
FRICTION DEVICE
Filed Feb. 10, 1932   2 Sheets-Sheet 2
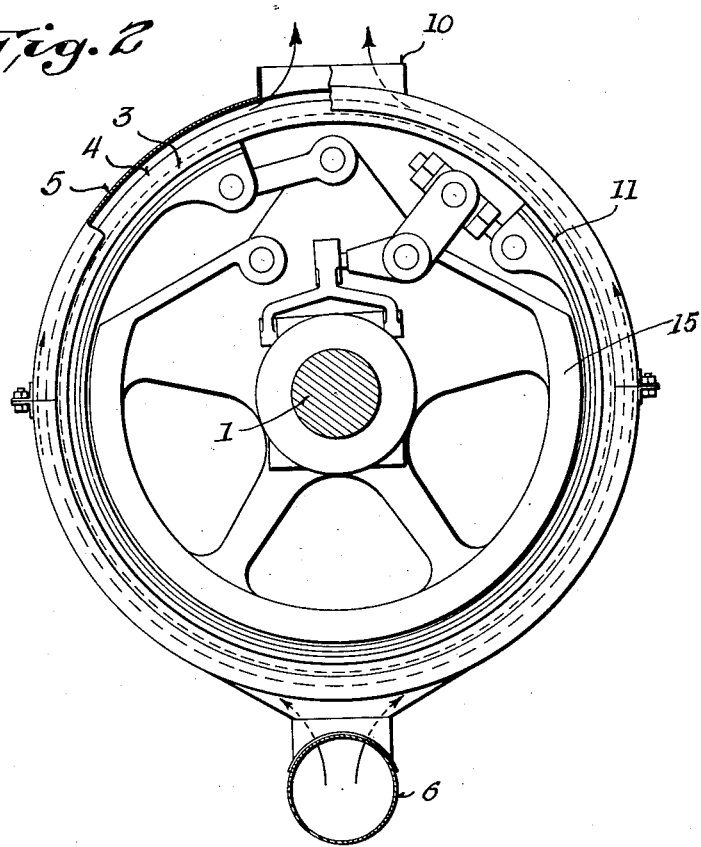
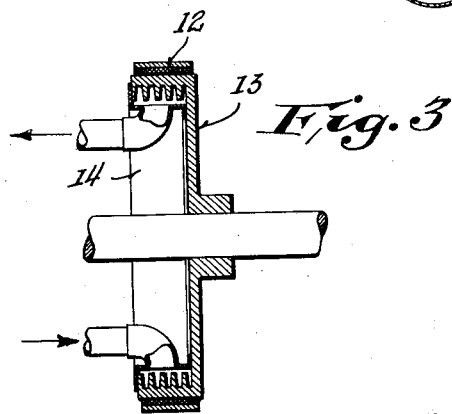
Inventor
Will S. Burdick
By
Attorney Patented Aug. 28, 1934

1,971,929

UNITED STATES PATENT OFFICE 1,971,929

FRICTION DEVICE

Will S. Burdick, West Allis, Wis., assignor to Harnischfeger Corporation, Milwaukee, Wis., a corporation of Wisconsin Application February 10, 1932, Serial No. 592,024

4 Claims. (Cl. 192—113)

This invention relates to friction devices which are capable of withstanding duties of increased severity.

One object of the invention is to provide means which may be employed in the transmission of mechanical energy through frictional engagement in amounts greatly exceeding those which have been heretofore possible.

It is a further object of this invention to provide means for transmitting mechanical energy through frictional engagement in a manner subject to control of unexpected reliability and responsiveness.

Further objects of this invention arising from the organization of the mechanical structure fabricated in accordance therewith are expressed in the following:

This invention is concerned primarily with the type of structure commonly known as a friction clutch. A friction clutch is a device for gradually coupling two rotating shafts and the uses to which such structures are put are too common to be described in detail here. There is, however, a specified field wherein such coupling means find no application, due to certain important limitations and defects which are overcome by this invention.

Prior to this invention frictional drives, such as clutches, were only suited to those services which required that an element be brought, within a reasonably short lapse of time, from rest to the velocity of the prime mover and thereupon move as a unit therewith. If the condition were such that there was a differential in speed between the driving and driven parts of the clutch for periods of appreciable duration, in the case of heavy machines, the clutch known prior to my invention was of little use. A clutch with a reasonable amount of exposed surface, for example, eight square feet, which is caused to slip under common conditions for one minute out of every three will not dissipate heat to the surrounding atmosphere at the calculated rate of appearance until the temperature of the clutch approaches 1000 degrees F. The design of a clutch to operate satisfactorily at such a temperature is practically impossible. A conventional type of clutch might be made which would withstand the duty outlined above. It would be of extremely large size, having an extremely large amount of heat dissipating surface, but its dimensions would be too great to permit a practical use thereof.

In normal operation the rotating cab of the excavator with all its attachments, such as the boom and tackle, weighing many tons and having enormous turning moment, was placed into swinging motion, stopped and placed into reverse swinging motion at least once every three minutes. The friction clutches were thus employed both as starting and stopping means. Under these conditions parts of the clutches exceeded in temperature seven hundred degrees Fahrenheit and rapid destruction of the lining occurred, together with cracking of main structural parts of the clutch itself, due to unequal thermal expansion.

In contrast to this the clutches of my invention, although of moderate size, when applied to the same machine as described above performed without exceeding two hundred and fifty degrees Fahrenheit under normal operation, the linings of the clutch served without replacement for a reasonable length of time and no mechanical failure of parts occurred.

In addition to the above expected improvements there was discovered, when the clutch of this invention was placed in operation, that a new result of primary importance and not predictable in advance had been obtained. This new result consisted in surprisingly reliable and delicate response on the part of the clutches to the actuation of the controls on the part of the operator of the machine. This new result has made it possible for an operator of normal skill and reliability to handle a machine to the full limit of its capacity with freedom and safety.

To assist in describing this invention reference is made to the accompanying drawings wherein Fig. 1 represents a side view of two clutches, on a common shaft, which are constructed in accordance with this invention;

Fig. 2 is an end view of a clutch constructed in accordance with this invention;

Fig. 3 is an optional form in which the device of this invention may be constructed.

In Fig. 1 are shown two clutches mounted upon a common driving shaft 1, the driving shaft being mounted to rotate in journal supports 2. The interior parts of the clutches are of the common internal expanding band type and are not shown in Fig. 1, but are shown in Fig. 2 wherein the bands 11 are secured to spiders 15 attached to the shaft 1 and cooperate when expanded with the interior surfaces of the drums 3. The exterior surfaces of the drums 3 may be provided with fins 4.

Surrounding the exterior surfaces of the drums 3 are conduits 5 for conveying a current of air in contact with the surfaces of drums 3 and fins 4. Attached to the conduits 5 and connected therewith is a supply pipe 6 which in turn communicates with air-moving means 7 which is provided with a suitable means for cooperative attachment with a suitable motivating source, not shown. The drums 3 in this embodiment constitute the driven portion of the clutch and secured to the drums 3 are gears or other means cooperating with the parts to be moved within the casing 9.

As indicated in Fig. 2, while in operation air enters through supply pipe 6, divides and flows as indicated by the arrows into contact with the drum 3 in the confined space provided by conduit 5 and escapes through the outlet 10, as indicated by the arrow. The air thus flowing is supplied in abundant quantity and flows in contact with drums 3 and fins 4 at high velocity. The high velocity of the air reduces the thickness of the stagnant air film on the surface of the drum and increases the coefficient of heat transfer from the drum to the air. This increase in the coefficient of heat transfer is not simply one of degree, but is a very pronounced increase. The velocity of the air passing through conduit 5 is easily maintained at a speed of several hundred feet per second, which is thirty or forty times the mean velocity of air in contact with a slowly rotating clutch of the type known prior to this invention. Coefficients of heat transfer increase roughly in proportion to the velocity of the air, consequently the coefficient of heat transfer obtained by this invention may be twenty or thirty times as great as in the case of clutches known prior to this invention. This greatly increased coefficient makes possible the transfer of a large amount of heat to the air flowing in conduit 5, with a relatively small temperature difference between the clutch and the air.

In Fig. 3 is shown an embodiment of my invention which may be a contracting type clutch wherein a band 12 and drum 13 and the conduit 14 may be employed.

While I have herein referred only to the use of the fluid air, I wish the term "air" to comprehend and mean any gaseous fluid which might be supplied for the purpose for which the air is supplied.

I desire it to be understood that this invention is not to be limited to any specific form or arrangement of parts except insofar as such limitations are set forth in the claims.

What I claim as my invention is:

1. In frictional devices wherein heat is generated, the combination of moving means in frictional contact with resisting means, said resisting means being a material of high thermal conductivity with respect to said moving means, means forming confined passages in conjunction with said resisting means, a supply pipe connected with said confined passage, said supply pipe having a cross-sectional area at least as great as the total cross-sectional area of said confined passage, and means for forcing air through said supply pipe and said confined passages.

2. In frictional devices wherein heat is generated, the combination of moving means in frictional contact with resisting means, said resisting means being a material of low thermal conductivity with respect to said moving means, means forming confined passages in conjunction with said moving means, a supply pipe connected with said confined passage, said supply pipe having a cross-sectional area at least as great as the total cross-sectional area of said confined passages, and means for forcing air through said supply pipe and said confined passages.

3. In a clutch suitable for use with heavy machinery, a combination comprising a driving shaft, expansible cylindrical means secured thereto, means for expanding the same, cylindrical means of fixed dimension surrounding said expansible means and adapted to be driven thereby through frictional contact therewith when said expansible means is expanded, means surrounding said cylindrical means of fixed dimension forming a confined passage therewith, a supply pipe connected with said confined passage, said supply pipe having a cross-sectional area at least as great as the total cross-sectional area of said confined passages, and means for forcing air through said supply pipe and said confined passage.

4. In a clutch suitable for use with heavy machinery, a combination comprising a driving shaft, contractable cylindrical means secured thereto, means for contracting the same, cylindrical means of fixed dimension within said contractable means and adapted to be driven thereby through frictional contact therewith when said contractable means is contracted, means located within said cylindrical means of fixed dimension forming a confined passage therewith, a supply pipe connected with said confined passage, said supply pipe having a cross-sectional area at least as great as the total cross-sectional area of said confined passages, and means for forcing air through said supply pipe and said confined passage.

WILL S. BURDICK.